(12) United States Patent
Trott et al.

(10) Patent No.: US 6,594,079 B1
(45) Date of Patent: Jul. 15, 2003

(54) IMAGE SCREEN AND METHOD OF FORMING ANTI-REFLECTIVE LAYER THEREON

(75) Inventors: Gary R. Trott, San Mateo, CA (US); Andreas Weber, Redwood City, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/368,485

(22) Filed: Aug. 4, 1999

(51) Int. Cl.[7] .............................................. G03B 21/60
(52) U.S. Cl. ...................................................... 359/456
(58) Field of Search ................................. 359/443, 450, 359/456, 457, 460

(56) References Cited

U.S. PATENT DOCUMENTS

| | | | |
|---|---|---|---|
| 1,942,841 A | 1/1934 | Shimizu ........................ 88/24 |
| 4,172,219 A | * 10/1979 | Deml et al. ............... 219/121.6 |
| 4,490,010 A | 12/1984 | Honda et al. ................ 350/128 |
| 4,605,283 A | * 8/1986 | Stanton ....................... 359/453 |
| 4,647,519 A | * 3/1987 | Speigel ........................ 359/456 |
| 4,666,248 A | 5/1987 | van de Ven .................. 350/128 |
| 4,936,652 A | 6/1990 | Clausen et al. .............. 350/128 |
| 4,979,801 A | 12/1990 | Park ............................ 350/128 |
| 4,993,806 A | 2/1991 | Clausen et al. .............. 350/128 |
| 5,064,273 A | 11/1991 | Lee .............................. 359/457 |
| 5,590,943 A | 1/1997 | Yoshida et al. ................ 353/74 |
| 5,613,748 A | 3/1997 | Yoshida et al. ................ 353/74 |
| 5,870,224 A | * 2/1999 | Saitoh et al. ................. 359/456 |
| 6,278,482 B1 | * 8/2001 | Ashizaki ...................... 359/453 |

FOREIGN PATENT DOCUMENTS

| | | | |
|---|---|---|---|
| EP | 0 753 791 | 1/1997 | .......... G03B/21/62 |
| FR | 972333 | 1/1951 | |

* cited by examiner

Primary Examiner—Christopher Mahoney
(74) Attorney, Agent, or Firm—Marc P. Schuyler; Ian Hardcastle

(57) ABSTRACT

This disclosure provides an image screen having anti-reflective qualities, such as might be used in projection television. In particular, an opaque black layer is formed on a front, viewer-side of the screen using the transmissive properties of the projection screen itself, e.g., as defined by a bubble lens array on the back side of the screen. In one embodiment, light is transmitted through a Fresnel lens, through a bubble lens array, and onto a photoresist to expose transmissive "pinholes" in the photoresist. Photoresist is then removed in unexposed areas, and an anti-reflective material is deposited over the entire viewer-side of the screen. Remaining photoresist is then removed from transmissive areas to leave the anti-reflective material in all areas not receptive to projection light. The material is developed and cured and the front side is optionally protected with a sealant layer. In a second embodiment, a light source is directed against the lens array and used to charge the front screen surface, which is then layered with a material which adheres to the screen only in the non-transmissive areas. Using either approach, the screen is preferably configured to have substantially all the screen covered by a permanent anti-reflective layer.

19 Claims, 3 Drawing Sheets

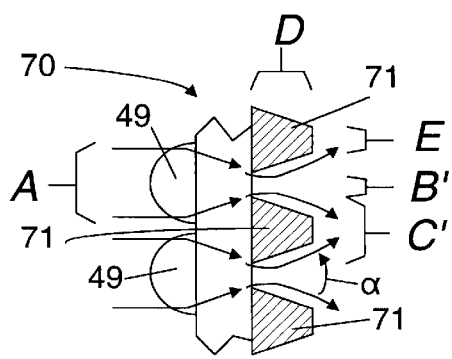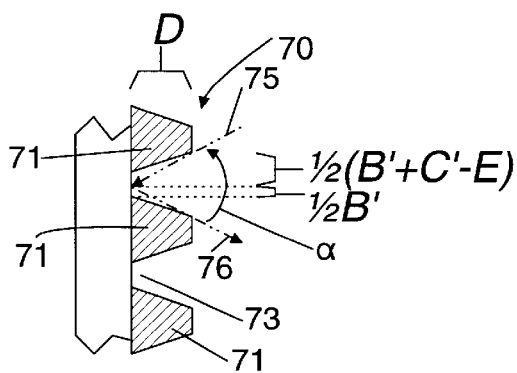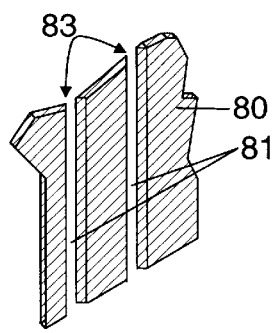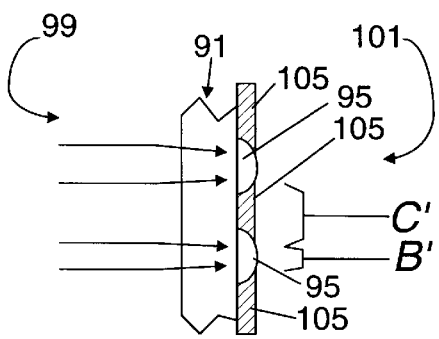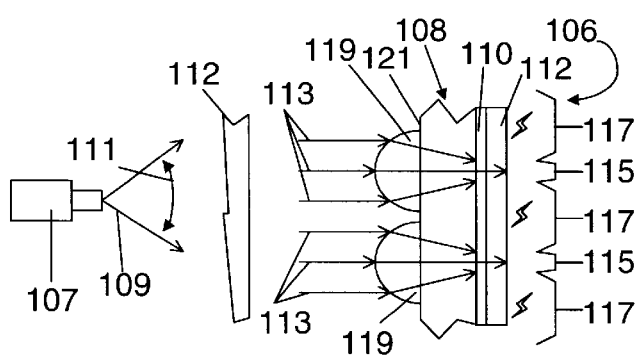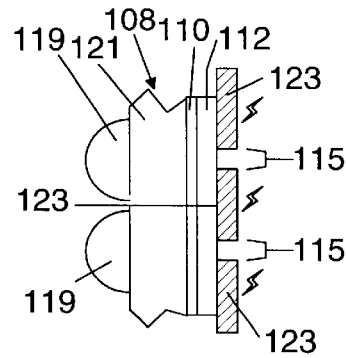

IMAGE SCREEN AND METHOD OF FORMING ANTI-REFLECTIVE LAYER THEREON

The present invention relates to image screens; more particularly, this disclosure provides a rear projection screen having anti-reflective layer and a method of forming and aligning that anti-reflective layer.

BACKGROUND

Image screens can be of various types, including rear projection screens, image generating screens and front projection screens. Rear projection screens in particular are illuminated from behind, with a visible image being dispersed by the screen itself to viewers in front of the projection screen. Image generating screens are similar to rear projection screens, since light is normally generated behind the front surface of the screen and is dispersed through the front surface of the screen to viewers within a desired viewing angle. Finally, front projection screens are illuminated from in front of the projection screen, e.g., the viewers and projection device are positioned on the same side of the screen.

Often, image screens are viewed in the presence of light which can reflect against the screen and detract from image quality. Television screens, for example, can include glass or plastic elements that reflect ambient light and reduce image contrast. As a result of these problems, some recent design efforts have focused on developing projection screens with reduced reflectivity of ambient light.

One method of reducing screen surface reflectivity, and thereby increasing the screen's contrast, involves the use of black strips which define opaque areas of the projection screen to reduce reflection of ambient light. In the context of rear projection screens, the projection image is redirected through a lens array on the back side of the screen, to concentrate projection light onto transmissive areas of the screen and generally around the black strips. The black strips are relatively thin, and generally do not perceptibly interfere with a viewer's perception of an image projected on the screen.

While the solution generally described above is satisfactory for its intended purpose, there are a number of shortcomings in this solution. For example, a pattern of black strips or other anti-reflective material must usually be precisely aligned to the transmissive areas so as to not degrade screen brightness, and such alignment is difficult. Also, the black strips typically only cover a small area of the total projection screen. As an example, a typical television screen might have black strips covering less than forty percent of the total screen area. A result of this latter shortcoming is that screen reflectance is often undesirably large despite the presence of the black strips.

FIGS. 1–3 are used to generally explain these shortcomings. In particular, FIG. 1 shows a cross section of a projection television (TV) screen 11 having an image source 13 and a projection screen 15 that disperses image light to viewers within a desired field of view. The projection screen includes a Fresnel lens 17 which receives light beams 27 from the image source and redirects the light beams in a manner such that they traverse a direction perpendicular to the screen. Light passing through the Fresnel lens then strikes an array of lenses 19, which are seen in FIG. 1 to be semi-cylindrical column lenses that vertically span the interior of the projection screen 15. These lenses redirect light from the image source to transmissive columns formed around "black strip" areas 23, mounted to the screen's main body 21. The screen also usually includes a dispersing element (not seen in FIG. 1), which vertically scatters light focused by the array of lenses for end viewing.

FIG. 2 presents a perspective view of the viewer-side 28 of the TV screen of FIG. 1. In particular, the screen 15 is often oriented such that the black strips 23 extend vertically from the top of the screen to the bottom of the screen. The light source (not seen in FIG. 2) forms an image against the back side 30 of the screen. FIG. 2 also shows a light bulb 31, which represents a source of ambient light 33 against the viewer-side 28 of the projection screen. The black strips are used to reduce reflected light 35 from degrading image contrast.

As shown in FIG. 3, the lenses 19 focus light toward an aperture and focal region, ideally around the black strips 23. However, it is usually difficult to precisely align the black strips with these optical paths, and the result is often that the black strips need to be placed relatively far apart, such that the portion of the screen covered by anti-reflective material ("C"/"C"+"B") is often much less than fifty percent of total screen area. Further still, the black strips and transmissive areas for the optical paths are often made relatively large for ease of alignment, rendering it difficult to achieve certain efficiencies in anti-reflectance that might be gained if the transmissive areas were made quite small. The alignment problem can be compounded when a scattering layer 37 or viewer-side array of cylindrical lenses 38 is employed in the screen to disperse light.

A definite need exists for an image screen that maintains high image contrast. More particularly, a need exists for an image screen which significantly reduces reflection of ambient light on the viewer-side of the screen. Further still, a need exists for a method of forming and efficiently aligning an anti-reflective layer with non-transmissive areas of the screen, ideally such that the anti-reflective layer occupies a very substantial portion of total screen area without significantly detracting from screen brightness or reducing image contrast. The present invention satisfies these needs and provides further, related advantages.

SUMMARY OF THE INVENTION

The present invention solves the aforementioned needs by providing an image screen having an anti-reflective layer formed using the optical pattern of the screen itself. By using projection light to define the contours of the anti-reflective and transmissive areas, the present invention provides for a precise "black strip" or "black layer" alignment mechanism, such that almost all of the screen can be layered with an anti-reflective layer while maintaining image brightness. Further still, it is expected that as much as ninety-nine percent or more of the screen can be made reflection resistant in this manner, improving the image contrast by substantially reducing conflict with ambient light. It is expected that the present invention will find wide application to projection television and similar systems.

One form of the invention provides a method of forming an anti-reflective layer in or on an image screen. This method calls for using lens elements of the screen to shine light toward the screen's front surface. The optical pattern formed in this manner is used to place a reflection resistant material upon the screen in all locations, except those portions of the screen that substantially correspond with the primary optical paths of projection light through the screen. In more detailed features of this form of the invention, the material can be created using a photoresist which is adhered to the screen and then exposed and developed by projection through the lens elements to remove photoresist material at screen locations not receptive to projection light; a black anti-reflective layer is then deposited on top of the screen, with exposed photoresist subsequently being removed to leave the anti-reflective layer in the non-transmissive areas. Alternatively, projection light can be used to provide relative charge to areas that should not be transparent to light, and a material can then be applied which sticks to charged areas of the screen, such that the material remains upon all portions of the screen except the transmissive portions. In each of these more detailed aspects of the invention, transmissive portions of the screen closely align with the primary optical paths of light to be transmitted through the image screen during the screen's normal use.

A second form of the invention provides an image screen having an anti-reflective layer created using the focal pattern of the screen, while a third form of the invention provides an improvement in screen fabrication.

In more detailed features of the invention, the anti-reflective layer is formed to have pinholes through which projected light travels; the pinholes closely align with projection light, and so, the anti-reflective surface can be formed to very accurately cover most all of the screen that does not transmit light. In this manner, it is expected that in some applications, ninety percent or more of the screen's surface may be made resistant to reflection of ambient light.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIG. 1 shows a light source that directs light across a back side of a projection screen; the screen has a Fresnel lens 15, an array of lenses 19, a solid glass or plastic screen base 21 and a set of black anti-reflective strips 23 on a front, viewer-side 28 of the screen.

FIG. 2 also indicates the formation of a projection image upon the back side 30 of the screen. The dimension and associated arrows "W" of FIG. 2, correspond to the dimension and associated arrows "W" of FIG. 1.

FIG. 6 provides a close-up, cross-sectional view of the primary structure of a projection screen, including lenses 49 of an array 55 and a solid glass or plastic screen main body 57 used to convey light from lenses to viewers.

FIG. 7 provides a view similar to that seen in FIG. 6, but in which a photoresist material 61 has now been deposited upon the assembly of FIG. 6.

FIG. 8 shows the screen of FIG. 7 as well as the use of a light source 64 to project light rays 63 through the lenses in the array toward corresponding focal points 65, to thereby expose portions of the photoresist material. These focal points are illustrated in FIG. 7 to lie directly in the middle of the photoresist material, but in fact, the focal points do not have to be so-positioned.

FIG. 9 provides a view similar to that seen in FIG. 8, but wherein the photoresist layer is now seen to have both unexposed portions 67 and exposed portions 68.

FIG. 10 shows the assembly of FIG. 9, but in which the unexposed portions have been removed, while exposed portions 68 remain over the transmissive areas of the screen; FIG. 10 also shows the addition of a black material layer 66 (e.g., carbon black) over the entire screen.

FIG. 11 shows the assembly of FIG. 10 in which the screen is now washed to remove all photoresist, thereby removing the black material layer in transmissive areas of the screen. The screen may be optionally sealed using a non-reactive and non-reflective transparent layer 69.

FIGS. 12–13 show an alternative embodiment 70 in which a back, anti-reflective layer 71 is made of deliberate thickness calculated to block any light from outside a desired viewing angle "α" from being incident upon transmissive areas.

FIG. 12 provides an illustration similar to FIG. 4, but in which thickness "D" of the photoresist layer 71 is tailored in relation to transmissive area width "B" and desired viewing angle "α," to prevent incident light from outside the desired viewing area from being incident upon the transmissive areas.

FIG. 13 provides an illustration similar to FIG. 12, and illustrates a narrow range of incident light that can potentially reflect upon transmissive areas of the screen, with all light from outside the angle "α" necessarily hitting only the black anti-reflective layer.

FIG. 14 presents an alternative embodiment where transmissive areas 81 are configured as vertical columns 83 rather than as pinholes.

FIG. 15 illustrates an alternative embodiment 91 where a screen dispersive element is configured as a number of viewer-side bubble lenses 95.

FIGS. 16–17 illustrate an alternative optical process used to expose and develop an anti-reflective layer.

FIG. 16 illustrates use of a projection system 107 to generate relative charge on a viewer-side 106 of the screen in non-transmissive areas only; the viewer side of the screen includes a first, transparent metal layer 110, and a second, photoconductive layer 112.

FIG. 17 shows the structure of FIG. 16, but in which an anti-reflective material 123 has been added. This material only adheres to the screen in the areas not affected by the projection system (labeled 117 in FIG. 16). In this regard, the photoconductive layer is swiped with a charging device, such as used in laser printing; when exposed to light (such as in transmissive areas of the screen), the photoconductive layer discharges the screen's charge in these areas, such that charge remains only in areas that are to receive the anti-reflective material. The anti-reflective material in these areas may then be cured or hardened.

DETAILED DESCRIPTION

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of a rear projection screen having a black surface with transmissive holes or gaps that reduce contrast degradation from incident light. The invention, however, may also be applied to other types of systems as well.

In accordance with the principles of the present invention, a preferred image screen features an anti-reflective layer having transmissive portions that are well aligned with primary optical paths formed by light traveling through screen. Using these paths, which are generally fixed by prefabrication of screen optics, to carve out limited, transmissive portions of the screen, the preferred fabrication method provides for highly efficient screens where nearly the entire viewer-side can be made to resist reflection of light from ambient light sources, thereby reducing contrast.

FIGS. 4–11 illustrate the basic structure and fabrication of the preferred image screen where transmissive areas of the screen are configured as pinholes. FIGS. 12–13 illustrate an alternative screen where thickness and transmissive/opaque boundary shape can be tailored for specific purpose, such as to cut-off reflectance of any incident light from outside of the desired viewing angle "α." FIG. 14 illustrates an alternative screen provided by the present invention, where transmissive and opaque portions of the screen can be configured as columns and a separate scattering element is used for vertical light dispersion (whereas the bubble lenses of FIGS. 4–11 provide that function in both horizontal and vertical dimensions). FIG. 15 shows an embodiment where opaque areas are formed around dispersive bubble lenses on a viewer-side of the screen. Finally, FIGS. 16–17 illustrate an alternative method of fabricating an anti-reflective layer to form any of the aforementioned screens.

Figure 1:
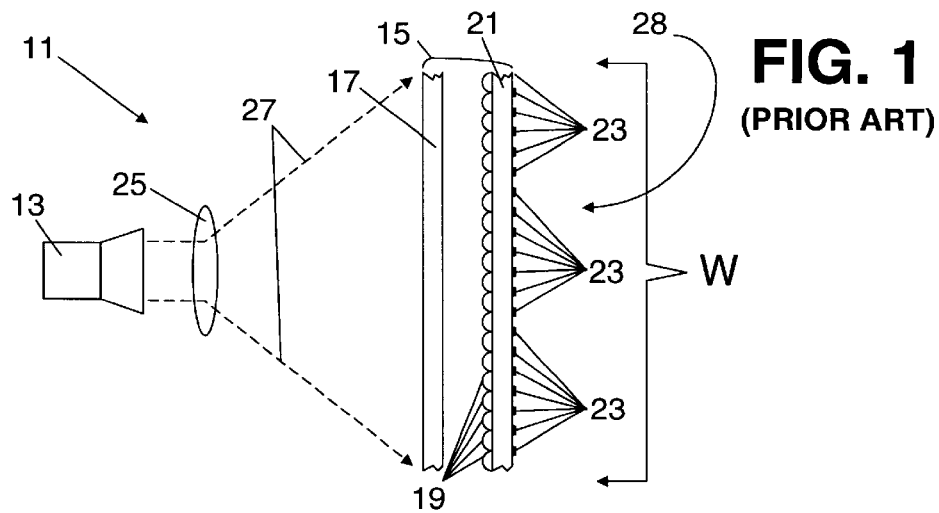
FIG. 1 illustrates a horizontal cross-section of a known projection system 11, e.g., a projection screen used in television (TV) sets. In particular.
Figure 2:
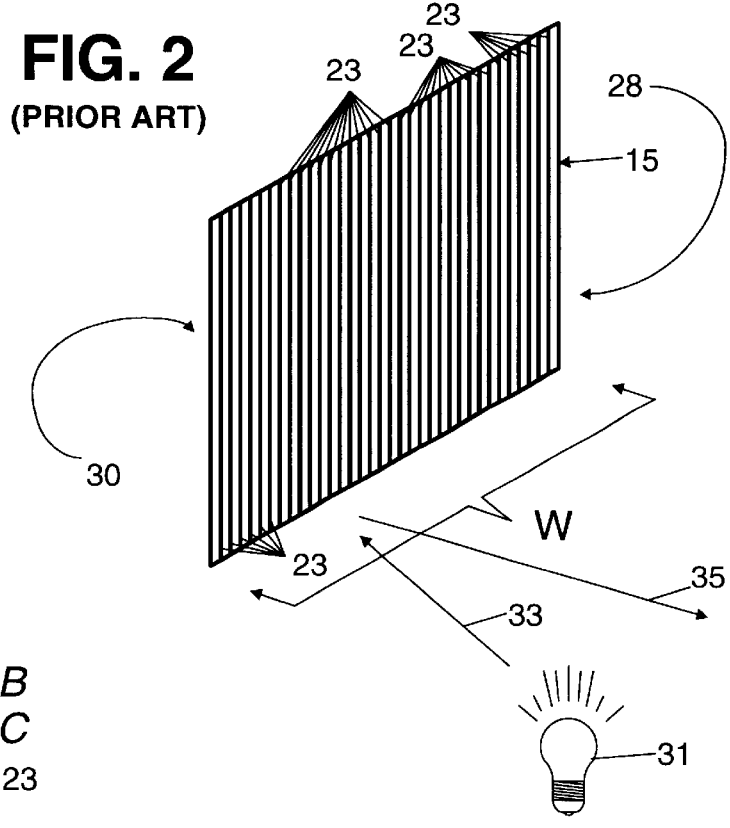
FIG. 2 provides a perspective of the front side 28 of the screen of FIG. 1, and illustrates the black strips 23, which are used to reduce viewer-side reflection 35.
Figure 3:
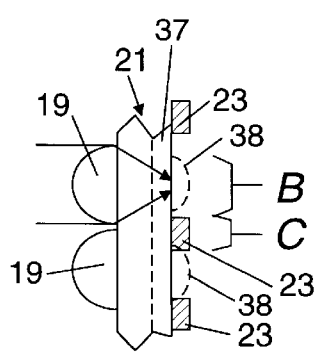
FIG. 3 provides a close-up view of the screen including two lenses 19 from the array of FIG. 1, taken in horizontal cross-sectional.
Figure 4:
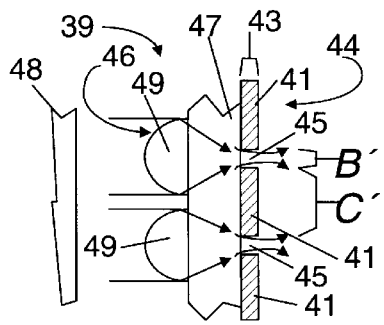
FIG. 4 provides a close-up view similar to that of FIG. 3, but which instead illustrates configuration of a preferred screen 39 made in accordance with the present invention. More particularly, opaque areas 41 of the screen are defined by an anti-reflective layer 43 which covers most all of the screen, except for transmissive areas 45 used for projected light.

As seen in FIG. 4, the preferred screen is a rear projection screen 39 (such as a projection TV screen) covered with areas that are opaque and transmissive to light, respectively. Opaque areas 41 are formed from of a black anti-reflective layer 43 positioned at or near the exterior of a front surface 44 of the television screen to reduce the reflection of ambient light. Within this anti-reflective layer, transmissive areas 45 are formed as pinholes which ideally occupy only a tiny fraction of the TV screen's total area, ideally such that ninety-nine percent or more of the screen is layered with opaque, anti-reflective black material. In this regard, the designation "B'" refers to the diameter of the preferred pinholes in FIG. 4, whereas the designation "C'" refers to the average distance between adjacent pinholes. The term "anti-reflective" as used herein means that the material reduces the screen's overall reflectance of ambient light.

Figure 5:
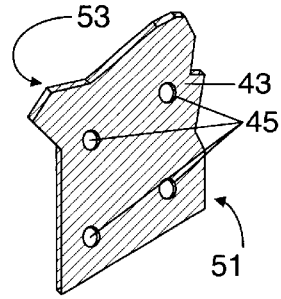
FIG. 5 provides a perspective close-up view of the structure seen in FIG. 4, observed from a front side 51 of the screen. More particularly, it is seen that transmissive areas 45 of the screen are preferably configured as pin holes in an anti-reflective layer 43.

The formation of the preferred pinholes in the preferred embodiment is accomplished using the optics of the projection screen itself. In this regard, a Fresnel lens 48 directs parallel light rays toward the projections screen 39. Lenses within the screen then disperse those rays to viewers within a desired viewing angle. Preferably, a main body 47 of the screen includes on its back (or internal projection) side 46 an array of bubble lenses 49, which is formed in the screen to redirect image light through individual points (or "pixels") for transmission through the screen and for dispersion to a viewing angle. These lenses are also used in fabrication of the preferred embodiment to carve out the transmissive areas of the anti-reflective layer 43. Importantly, the use of individual lenses for each pixel enables independent control of aperture size in each of X and Y dimensions of the image screen. In the discussion below, it is assumed that the lenses and the resultant "pinholes" are generally symmetric, e.g., circular, as indicated in FIG. 5, square, hexagonal or a similar shape; such does not have to be the case, and an embodiment is discussed below where a cylindrical lens array and resultant transmissive "columns" are employed. Also, the word "pixel" as used herein will refer to the smallest dimension of transmissive elements in the projections screen, whereas "image pixel" will be used to refer to the smallest distinct picture element. In all the embodiments discussed herein, there should be at least one pixel for each image pixel, preferably four or more.

The relative portion of the preferred screen covered by an opaque anti-reflective layer is roughly defined by the equation $$1 - \frac{C'^2}{(B' + C')^2}.$$

Importantly, the equation shown above and the structure seen in FIGS. 4–11 present the preferred case where the pattern of transmissive regions in the anti-reflective layer are configured as pinholes, but it should be understood that this configuration is the result of the primary optical pattern generated by the lenses 49. In fact, nearly any geography may be used such as hexagons, squares, ellipses or transmissive columns (the columns may be separated by black strips and extend the entire height of the screen, as described further below with reference to FIG. 13).

FIG. 5 illustrates the preferred pinhole pattern. Importantly, the relative dimensions of the pinholes in opaque areas of the screen seen in FIG. 5 are used for illustrative purposes only, and in fact, it is expected that in many applications, such as in conventional projection TV screens, the pinholes may be made to occupy less than one percent of the entire screen area, such that more than 99% of the screen is covered with an anti-reflective layer.

Figure 6:
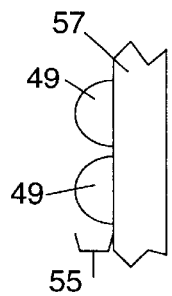
FIGS. 6–11 are used to explain the preferred method of fabricating the image screen of FIGS. 4 and 5.

FIGS. 6–11 are used to illustrate the preferred process of making an anti-reflective layer on a projection screen and of aligning that layer to the optical patters of the screen. In particular, FIG. 6 shows a portion of the screen having lenses 49 of a bubble array 55 on the back side of a screen main body 57. The screen main body 57 should be assumed to be made of glass or clear plastic. Each lens 49 receives light and directs it through a focal point; doing so, it disperses the light toward the viewers through the screen's surface. Alternatively, if a bubble lens array is not used as illustrated in FIG. 6, the dispersive element may be formed out of a lens array on the viewer side of the screen, a layer within the main body which scatters light, or some other optical mechanism for dispersing light.

Figure 7:
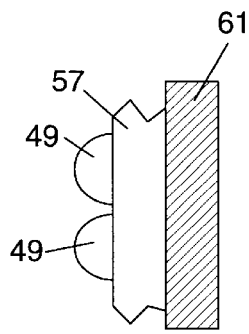

As seen in FIG. 7, the preferred method of forming and aligning the anti-reflective layer calls for depositing a photoresist layer 61 on the viewer-side of the main body. The relative geometries depicted by FIG. 7 are illustrative only, and in fact, it is preferred to layer the screen with a photoresist to a depth of approximately 15 microns.

Figure 8:
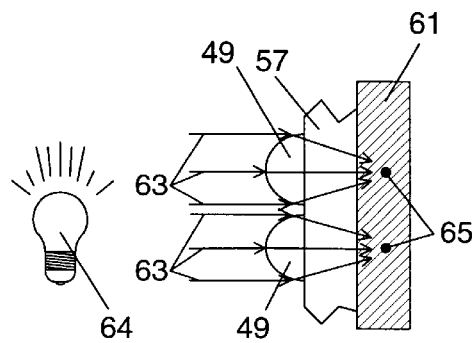

Once the photoresist layer has been deposited, it is exposed as indicated in FIG. 8, and later developed. As seen in FIG. 8, a light source 64 projects light rays 63 through the screen as might be done during normal use of the screen. In a rear projection application, for example, a Fresnel lens (not seen in FIG. 8) could be used to redirect light rays 63 toward individual bubble lenses 49 in the screens' back side lens array. Such a process could potentially be performed on a finished screen assembly, but it is preferable to operate on the screen main body itself, either before its combination with a Fresnel lens (if used for the particular application) or immediately afterward. The bubble lenses 49 are preferably configured to cause the convergence of these light rays 63 toward a focal point or region 65.

The focal points or regions 65 (and associated apertures for projected light) are illustrated in FIG. 8 to lie approximately in the middle of the photoresist material 61. Normally the bubble lenses 49 are configured such that their foci are at a defined location with respect to the screen, but such does not necessarily have to be the case. For example, if a different lens array is used (e.g., an array of cylindrical columns as shown in FIG. 14), then the dispersive element would include a scattering layer of the main body 57 and the focal points or regions 65 might lie relatively close to the interface between them; on the other hand, if the dispersive element was defined by an array of bubble lenses on the viewer-side of the projection screen, the points or regions might lie close to the individual bubbles themselves.

Figure 9:
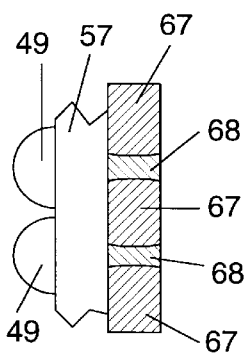

FIG. 9 illustrates the formation of transmissive pinholes in connection with the preferred image screen. The projection of light through the photoresist material causes the photoresist to have unexposed areas 67 which have not received light from the bubble lenses 49, as well as exposed areas 68 which will be temporarily retained in order to form the pinholes. The unexposed areas 67 are removed when the photoresist is developed. For example, in making the preferred screen, the photoresist is chosen to be a material such as "Az1512" made by the American Hoechst Company, or "Riston" made by DuPont, or a similar photoresist material. Each material has its own processing instructions and optimal thicknesses, which are provided by the manufacturer's instructions. The material is developed in accordance with these instructions, and for example, might be cured and hardened through a series of baths and/or baking steps as appropriate.

Figure 10:
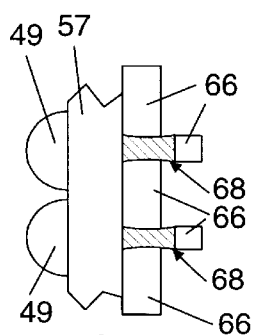
Figure 11:
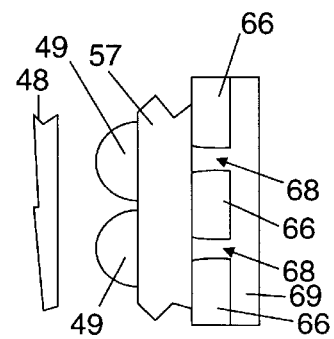

As seen in FIG. 10, the assembly is then overlaid with an opaque anti-reflective layer 66 such as carbon black. In transmissive areas 68 of the screen, the carbon black will sit atop developed photoresist material. As indicated in FIG. 11, the photoresist can then be completely removed from the assembly using a washing or etching process, as indicated by manufacturer's instructions or otherwise appropriate in view of the materials used. The anti-reflective layer 66 is seen in FIG. 11 as being relatively thin; this depth, however, may be varied to achieve further reductions in ambient light reflection, such as is described with reference to FIGS. 12 and 13.

Because the anti-reflective layer 66 may be subject to abrasion and scratching, once developed, the entire screen assembly may be (and preferably is) covered with a thin protective coating 69 which preferably is a non-reflective clear plastic material that is approximately 100 microns thick, with a thin anti-reflective coating added to an additional few microns thickness. Selection of a suitable protective layer is believed to be well within the skill of one familiar with conventional projection screen fabrication. As seen in FIG. 11, transmissive areas of the anti-reflective layer are formed by and exactly at the optical paths of light projected through the screen.

FIGS. 12–13 are used to illustrate an alternative embodiment, where depth of the anti-reflective layer is specially tailored to provide further reductions of reflected ambient light. As discussed elsewhere herein, an anti-reflective layer to retard reflected light may be made using principles of the present invention to cover nearly all of the screen, up to ninety-nine percent of the screen or more. However, further gains can potentially be achieved using the embodiment of FIGS. 12–13 to present an anti-reflective layer which provides one hundred percent screen coverage with respect to light originating from outside the desired viewing angle. This alternative embodiment uses very small pinholes and anti-reflective layer depth which is on the order of the same size as pinhole width.

As seen in FIG. 12, this embodiment 70 includes the same array of lenses 49 on a back side of the screen, where each lens has an approximate diameter "A." Each pinhole has a width "B'," with typical distance between pinholes being "C'." The anti-reflective layer 71 may be tailored to have a specific shape, such as the pyramidal cross-sectional structure indicated in FIG. 12, having a thickness "D" and an outer distance between pinholes "E." The thickness and outer distance are specifically tailored in response to pinhole width "B'" and desired viewing angle "α."

This relationship is further illustrated by FIG. 13, which shows incoming and outgoing incident light rays 75 and 76, illustrated at the maximum incident angle which can possibly reflect upon the transmissive areas of the screen. For example, if it is desired to provide a desired viewing angle of one-hundred twenty degrees in the example depicted by FIG. 13, the geometries of the specific shape of the opaque areas of the screen around the pinholes would be selected such that $$\mathrm{Tan}\frac{\frac{1}{2}(B' + C' - E)}{D} = \frac{\pi}{3}.$$

The shape and slope of the anti-reflective layer 71 seen in FIGS. 12 and 13 are illustrative only, and any desired geography may be used.

FIG. 14 shows a close-up view of part of yet another alternative screen 81 where a semi-cylindrical columnar lens array is used for light focusing on the back side of the screen, instead of a bubble array as was described earlier. The semi-cylindrical lenses extend the entire height of the projection screen and would have the same horizontal cross-section as was depicted for the bubble lenses in FIGS. 12 and 13. However, instead of focusing light to a focal point or pixel, each lens focuses and disperses projection light only in the horizontal (X) dimension of the projection screen. In exposing and developing the photoresist layer as was described earlier, the primary optical path for the lenses in the array form transmissive columns, which are consequently exposed and removed from the photoresist layer. The result of this fabrication process is transmissive columns 83 which exactly align with the primary optical paths of the lens array, with black opaque anti-reflective material 81 resulting from the process being sculpted to cover the screen in substantially all non-transmissive areas. It is expected that in this alternative embodiment 80, a substantial portion of the image screen can still be covered with anti-reflective material, but not quite as much as with the pinhole configuration discussed above. In this, columnar embodiment 80, with a transmissive column width of B" and distance between columns of C", a percentage of the screen defined by approximately C"/(C"+B") would be covered by black opaque anti-reflective material. In this embodiment as well, it will usually be necessary to disperse light vertically, and thus a scattering layer typically would be used within the glass or plastic main body of the projection screen.

FIG. 15 illustrates yet another alternative image screen 91, which has a different lens set for use as the dispersive element. As with embodiments discussed previously, light is received through a back side 99 of the screen from a Fresnel lens (not seen in FIG. 14). The light is directed toward a focal point or region, where the light is dispersed by bubble lenses 95 on a viewer-side 101 of the screen. The lenses 93 and 95 depicted in FIG. 15 could alternatively represent semi-cylindrical columns, as was discussed above in connection with FIG. 15.

In this embodiment, formation of an anti-reflective layer 105 to closely align with the primary optical paths of projection light is performed exactly as described for the other embodiments described herein; using the preferred fabrication method, a photoresist material is deposited over the entire viewer-side 101 of the screen, and is exposed and removed using optical paths of the lenses. In this manner, part of the viewer-side lenses 95 will be covered with anti-reflective material, but not so as to interfere with the primary optical paths of projection light. The result is an anti-reflective layer have transmissive areas (each having a width or diameter B') and opaque areas (each having a distance C' between adjacent transmissive areas).

FIGS. 16 and 17 represent an alternative method of fabricating a screen according to the present invention, where the optical paths to be used for projection light are still used to develop limited transmissive areas in the screen, but where a photoresist is not used. Instead, a visible or non-visible light source 107 shines light 109 towards the main screen body 108. The light is directed within an arc 111, and a Fresnel lens 112 redirects light beams 113 toward bubble or columnar lenses 119 on the back side 121 of the image screen main body. The light is focused by the lens optics and used to develop charged regions 117 on a viewer-side 106 of the main body, much in the manner of operation of a laser printer.

In this regard, the viewer-side of the screen is (in this embodiment) first layered with a thin transparent metal layer 110, such as indium tin oxide (ITO), and a transparent photo-conductor layer 112 upon which charge is then deposited through a laser printing process. The photoconductive layer is an insulator except when and where exposed to light, and once the layer is exposed, the unexposed areas will retain their charge while the exposed areas lose their charge through the ITO layer.

Regardless of the particular procedure used, the screen is preferably coated with a material which, based on charge, adheres to the screen in the regions 117 which are to be made opaque, and not in the regions 115 that are intended to be made transmissive to light. Preferably, a laser printer material such as toner and associated processes are used to deposit this black, anti-reflective material layer over the photoconductive layer 112. It would be within the skill of an artisan to select a suitable opaque material for use in such a process, although it is expected that conventional laser toner such as made by the Hewlett-Packard Company might be a suitable choice for this alternative method of screen fabrication.

FIG. 16 illustrates the adherence of such a material 123, which is then cured and hardened according to the use instructions accompanying the material. Using conventional toner, as mentioned above, hardening might be performed by heating the assembly to a temperature of a few hundred degrees Celsius for approximately an hour. If desired, a protective sealing material may then be applied to the viewer-side of the screen to complete the process as was described earlier in connection with FIG. 11.

Having thus described several exemplary implementations of the invention, it will be apparent that various alterations, modifications, and improvements will readily occur to those skilled in the art. To take a few examples, there are other methods of placing anti-reflective material on the image screen using the optical properties of the screen itself, including the use of light sensitive dyes and photographic films. All such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. In an image screen having an array of lens elements, where each lens element in the array focuses light for an image point of the projection screen, a method of forming an anti-reflective layer that reduces light reflected by the image screen, said method comprising:

electrostatically charging the projection screen;

shining light through lens elements in the array to form a pattern of projected light through a front side of the projection screen to selectively discharge the projection screen in areas that are to be transmissive to projection light;

applying an anti-reflective material that adheres to the projection screen at locations responsive to the charge pattern defined by shining light through lens elements; and processing the anti-reflective material to adhere to the projection screen in all areas except those areas used for transmission of projection light through the projection screen.

2. A method according to claim 1, additionally comprising:

coating the projection screen with a transparent conductive layer; and coating the transparent conductive layer with a photoconductive layer.

3. A method according to claim 1, in which the anti-reflective material includes laser printer toner.

4. A method according to claim 1, further comprising encapsulating the anti-reflective layer on a viewer-side of the image screen using a substantially transparent protective layer formed over the anti-reflective layer.

5. A method according to claim 1, wherein the image screen further includes a mechanism that distributes projection light to viewers within a desired viewing angle, and wherein:

said method further comprises forming the anti-reflective layer to have a predetermined thickness; and the predetermined thickness is selected relative to width of transmissive portions of the image screen and the desired viewing angle such that the thickness of the anti-reflective layer prevents external light from outside the viewing angle from being incident to the optically-transmissive dispersion elements.

6. A method according to claim 1, in which processing the anti-reflective material includes heating the anti-reflective material.

7. An image screen, comprising:

a lens array, each lens in the array providing a dispersion element that disperses light to viewers within a viewing angle relative to the image screen; and an anti-reflective layer having transmissive portions therein operatively positioned between the lens array and the viewers;

wherein the anti-reflective layer is patterned using light directed through the lens array to selectively discharge an electrostatic charge applied to the image screen and an anti-reflective material is selectively adhered to the image screen at locations responsive to the charge pattern defined by shining light through lens elements such that the transmissive portions of the image screen are substantially coextensive with a primary optical path from each lens in the lens array, with the anti-reflective layer blocking transmission of light through substantially all portions of the image screen other than the transmissive portions.

8. An image screen according to claim 7, additionally comprising a transparent conductive layer and a photoconductive layer under the anti-reflective layer.

9. An image screen according to claim 7, in which the anti-reflective material includes laser printer toner.

10. An image screen according to claim 7, wherein the anti-reflective layer is patterned using the light from the lens array such that the transmissive portions are configured as pinholes in the anti-reflective layer.

11. An image screen according to claim 7, wherein the anti-reflective layer is patterned using the light from the lens array such that the transmissive portions are configured as columns in the anti-reflective layer.

12. An image screen according to claim 7, wherein the anti-reflective layer covers more than ninety percent of all image-viewing area of the image screen.

13. In a rear projection screen having an array of lenses that collimate projection light and an anti-reflective layer that reduces external light reflected through a viewer-side of the projection screen, an improvement comprising:

using an optical pattern of the array of lenses to define a pattern of electrostatic charge on the projection screen, through which projected light will be passed; and selectively adhering an anti-reflective material to the projection screen at locations responsive to the pattern of electrostatic charge defined by shining light through lens elements to form an anti-reflective layer coating substantially all of the projection screen other than the transmissive portions.

14. An improvement according to claim 13, additionally comprising:

coating the projection screen with a transparent conductive layer; and coating the transparent conductive layer with a photoconductive layer.

15. An improvement according to claim 13, further comprising using the electrostatic charge pattern to form transmissive elements on the projection screen which cover no more than forty percent of total area of the projection screen, with at least sixty percent of the total layer area of the projection screen being covered by the anti-reflective layer.

16. An improvement according to claim 13, wherein the improvement further comprises using an optical pattern formed by the array of lenses to create transmissive portions of the projection screen not overlaid by the anti-reflective layer, the transmissive portions being substantially coextensive with optical paths of light from individual lenses in the array of lenses.

17. An improvement according to claim 13, wherein the improvement further comprises a pattern of transmissive portions, where each transmissive portion is a pinhole and the ratio of area occupied by pinholes to total image-viewing area of the projection screen is less than ten percent.

18. An improvement according to claim 13, further comprising coating the projection screen with an anti-reflective layer having a predetermined thickness, the predetermined thickness selected in response to width of a desired viewing angle and width of individual transmissive portions of the screen to block light from outside the viewing angle from being incident with transmissive portions.

19. An improvement according to claim 13, in which the anti-reflective material includes laser printer toner.

* * * * *